United States Patent
Nakashima

(10) Patent No.: US 11,618,151 B2
(45) Date of Patent: Apr. 4, 2023

(54) POWER TOOL AND ROTARY TOOL

(71) Applicant: MAKITA CORPORATION, Anjo (JP)

(72) Inventor: Tatsuo Nakashima, Anjo (JP)

(73) Assignee: MAKITA CORPORATION, Anjo (JP)

( * ) Notice: Subject to any disclaimer, the term of this patent is extended or adjusted under 35 U.S.C. 154(b) by 320 days.

(21) Appl. No.: 16/930,639

(22) Filed: Jul. 16, 2020

(65) Prior Publication Data

US 2021/0016428 A1    Jan. 21, 2021

(30) Foreign Application Priority Data

Jul. 19, 2019 (JP) .............................. JP2019-133947
Oct. 28, 2019 (JP) .............................. JP2019-195493

(51) Int. Cl.
| | |
|---|---|
| *B25F 5/02* | (2006.01) |
| *B25B 21/02* | (2006.01) |
| *H02K 11/00* | (2016.01) |
| *H02K 11/28* | (2016.01) |
| *H02K 11/33* | (2016.01) |
| *H02K 7/14* | (2006.01) |

(52) U.S. Cl.
CPC ................ *B25F 5/02* (2013.01); *B25B 21/02* (2013.01); *H02K 7/145* (2013.01); *H02K 11/0094* (2013.01); *H02K 11/28* (2016.01); *H02K 11/33* (2016.01)

(58) Field of Classification Search
CPC ........... B25F 5/02; H02K 11/28; H02K 11/33; H02K 7/145; H02K 11/0094; B25B 21/02
See application file for complete search history.

(56) References Cited

U.S. PATENT DOCUMENTS

| | | | |
|---|---|---|---|
| 6,206,538 B1 | 3/2001 | Lemoine | |
| 6,536,536 B1 | 3/2003 | Gass et al. | |
| 8,981,680 B2 | 3/2015 | Suda et al. | |
| 9,712,091 B2* | 7/2017 | Sawano | B25F 5/00 |
| 10,131,043 B2* | 11/2018 | Mergener | B25B 23/1475 |
| 10,505,473 B2* | 12/2019 | Takano | B25F 5/00 |

(Continued)

FOREIGN PATENT DOCUMENTS

| | | |
|---|---|---|
| CN | 101293343 A | 10/2008 |
| CN | 101434062 A | 5/2009 |

(Continued)

*Primary Examiner* — Nathaniel C Chukwurah
*Assistant Examiner* — Lucas E. A. Palmer
(74) *Attorney, Agent, or Firm* — J-TEK Law PLLC; Jeffrey D. Tekanic; Scott T. Wakeman

(57) ABSTRACT

A power tool (1), such as an impact wrench (1), includes: a brushless motor (8); a motor housing (7), which houses the brushless motor (8); an anvil (4), which is rotationally driven by the brushless motor (8) and disposed forward of the brushless motor (8); a handle (3), which is disposed downward of the motor housing (7); a battery-mount part (5), which is disposed downward of the handle (3); a battery pack (6), which is mounted on the battery-mount part (5) by being slid relative to the battery-holding housing (5); and a controller (70) for controlling the brushless motor (8). A switch panel (73) having at least one manipulatable button (73c) and at least one display part is provided downward of the handle (3) and is tilted such that the switch panel (73) is higher in the front.

20 Claims, 8 Drawing Sheets

(56) References Cited

U.S. PATENT DOCUMENTS

| | | | |
|---|---|---|---|
| 11,014,176 B2* | 5/2021 | Jensen | B23D 49/162 |
| 2003/0196824 A1 | 10/2003 | Gass et al. | |
| 2005/0157489 A1 | 7/2005 | Oomori et al. | |
| 2006/0180327 A1* | 8/2006 | Nagasaka | B25B 21/02 |
| | | | 173/128 |
| 2007/0159812 A1 | 7/2007 | Oomori et al. | |
| 2009/0128062 A1 | 5/2009 | Watanabe et al. | |
| 2009/0309519 A1 | 12/2009 | Suzuki et al. | |
| 2011/0180286 A1* | 7/2011 | Oomori | H02K 9/06 |
| | | | 173/217 |
| 2011/0199756 A1 | 8/2011 | Oomori et al. | |
| 2012/0033405 A1 | 2/2012 | Oomori et al. | |
| 2013/0076271 A1 | 3/2013 | Suda et al. | |
| 2013/0193891 A1 | 8/2013 | Wood et al. | |
| 2014/0182869 A1* | 7/2014 | Kumagai | B25F 5/001 |
| | | | 173/93 |
| 2014/0371018 A1 | 12/2014 | Ito | |
| 2015/0022125 A1* | 1/2015 | Takano | H02P 29/68 |
| | | | 318/139 |
| 2015/0263592 A1* | 9/2015 | Kawakami | B25F 5/008 |
| | | | 451/359 |
| 2015/0364972 A1* | 12/2015 | Ito | H02K 5/04 |
| | | | 310/50 |
| 2017/0203418 A1 | 7/2017 | Kumagai et al. | |
| 2017/0326720 A1* | 11/2017 | Kuroyanagi | B25B 21/02 |
| 2018/0104810 A1 | 4/2018 | Ito | |
| 2018/0131058 A1* | 5/2018 | Wang | H01M 10/6556 |
| 2018/0205293 A1 | 7/2018 | Kawakami et al. | |
| 2018/0222022 A1* | 8/2018 | Kumagai | B25D 11/04 |
| 2018/0236572 A1* | 8/2018 | Ukai | B23D 51/16 |
| 2019/0143491 A1 | 5/2019 | Kumagai et al. | |
| 2020/0047322 A1 | 2/2020 | Ito | |

FOREIGN PATENT DOCUMENTS

| | | |
|---|---|---|
| CN | 103009350 A | 4/2013 |
| CN | 103223655 A | 7/2013 |
| CN | 103894650 A | 7/2014 |
| JP | 5627738 B2 | 11/2014 |
| JP | 2018183874 A | 11/2018 |

* cited by examiner

POWER TOOL AND ROTARY TOOL

CROSS-REFERENCE

The present application claims priority to Japanese patent application serial number 2019-133947 filed on Jul. 19, 2019 and to Japanese patent application serial number 2019-195493 filed on Oct. 28, 2019, the contents of which are incorporated fully herein by reference.

TECHNICAL FIELD

The present invention relates to a power tool and a rotary tool, such as an impact wrench in which a battery pack serves as a power supply.

BACKGROUND ART

A power tool and a rotary tool, such as an impact driver, an impact wrench, and the like, are known in which a battery pack is used as a power supply. For example, Japanese Laid-open Publication 2018-183874 discloses a power tool having a battery-mount part (battery-holding housing), on which a battery pack is mounted, that is provided on a lower end of a grip part (handle) extending downward away from a main body that has been equipped with a motor and an output part. A terminal block (tool-side terminal), to which the battery pack is electrically connected, and a controller, to which an operating power supply is supplied via the terminal block, are each housed inside the battery-mount part. In addition, a switch panel, which comprises a manipulatable part, a display part, etc., is provided on the battery-mount part.

SUMMARY OF THE INVENTION

Because the upper surface of the battery-mount part of the above-described known power tool is provided in a tilted manner such that the upper surface is lower in the front, the switch panel also has a tilted attitude such that the switch panel is lower in the front. Thereby, from the viewpoint of the user, the switch panel is difficult to view and to manipulate while the user is holding the grip part.

In addition or in the alternative, because the tool-side terminal and the controller are disposed such that they are arranged side-by-side in the up-down direction inside the battery-holding housing, the height of the battery-holding housing in the up-down direction must be at least the combined thickness of the tool-side terminal and the controller. Therefore, such a design makes it difficult to reduce the thickness of the battery-holding housing in the up-down direction in order to reduce the height of the entire product in the up-down direction.

Accordingly, one non-limiting object of the present teachings is to provide a power tool and a rotary tool that provide improved visibility and ease of operation of the switch panel.

In addition or in the alternative, another non-limiting object of the present teachings is to provide a power tool and a rotary tool in which it is possible to make the entire product more compact, in particular in the up-down direction, by reducing the thickness of the battery-holding housing.

In one aspect of the present teachings, a power tool comprises:
a motor;
a motor housing, which houses the motor;
a battery-holding housing, which is connected to the motor housing;
a battery pack, which is mounted on the battery-holding housing by being slid thereon (relative thereto); and
a controller housed in the battery-holding housing and configured to control the motor;
wherein the battery pack and the controller overlap one another in a sliding direction of the battery pack.

In another aspect of the present teachings, a rotary tool comprises: a motor;
a tool-accessory retaining part, which is rotationally driven by the motor and is disposed forward of the motor;
a motor housing, which houses the motor;
a grip housing, which is disposed downward of the motor housing;
a battery-holding housing, which is disposed downward of the grip housing;
a battery pack, which is mounted on the battery-holding housing by being slid thereon (relative thereto) in a front-rear direction; and
a controller housed in the battery-holding housing and configured to control the motor;
wherein:
an upper portion of the battery pack has an outer shape that is tilted such that it is higher in the front or inclines upwardly (toward the tool-accessory retaining part) in the front-rear direction; and
the controller is disposed with a tilt attitude that is higher in the front or inclines upwardly (toward the tool-accessory retaining part) in the front-rear direction.

The tilted upper portion of the battery pack may include a tab (upward projection) that is configured to latch with the battery-holding housing when the battery pack is mounted on the battery-holding housing. In such an embodiment, the controller and the tab overlap one another in a sliding direction of the battery pack, i.e. in the direction that the battery pack slides relative to the battery-holding housing when mounting the battery pack on the rotary tool.

In addition or in the alternative, the rotary tool may include:
a tool-side terminal (e.g., a terminal block), which is held on a lower side of the controller inside the battery-holding housing and is electrically connectable to the battery pack;
wherein the controller and the tool-side terminal each have a plate shape that is thin walled in the up-down direction, and the tool-side terminal extends in a direction that differs from the direction in which the controller extends. In other words, the controller extends in a first plane and the tool-side terminal extends in a second plane; the first and second plane intersect each other, i.e. they are oblique.

In addition or in the alternative, the rotary tool may include:
a tool-side terminal (e.g., a terminal block), which is held on a lower side of the controller inside the battery-holding housing and is electrically connectable to the battery pack;
wherein the tool-side terminal has a plate shape that is thin walled in the up-down direction, and the battery-holding housing extends in a direction that differs from the direction in which the tool-side terminal extends. In other words, the battery-holding housing (at least a portion thereof, such as a portion of an upper surface thereof) extends in a first plane and the tool-side terminal extends in a second plane; the first and second plane intersect each other, i.e. they are oblique.

In addition or in the alternate, the battery-holding housing may include a switch panel for manually inputting instructions and for displaying information, the switch panel being disposed at an attitude such that the switch panel (e.g., an upper surface thereof) is parallel to the controller.

In another aspect of the present teachings, a power tool comprises:
- a motor;
- a motor housing, which houses the motor;
- a tool-accessory retaining part, which is rotationally driven by the motor and is disposed forward of the motor;
- a grip housing, which is disposed downward of the motor housing;
- a battery-holding housing, which is disposed downward of the grip housing;
- a battery pack, which is attached to the battery-holding housing by being slid thereon (relative thereto);
- a controller for controlling the motor; and
- a switch panel for manually inputting instructions and for displaying information that is provided, downward of the grip housing, in a tilted manner such that the switch panel is higher in the front.

The switch panel may be provided on the battery-holding housing such that the switch panel is exposed at the upper surface of the battery-holding housing and the upper surface of the switch panel is tilted such that the switch panel is higher in the front.

The controller may be housed in the battery-holding housing, such that the switch panel is disposed on an upper side of the controller.

In addition or in the alternative, the controller is tilted such that it is parallel to the upper surface of the battery-holding housing and is higher in the front.

In addition or in the alternative, a light, which illuminates the space forward of the tool-accessory retaining part, is provided along a forward extension of the controller on a front surface of the battery-holding housing.

In some embodiments of the present teachings, the controller may be housed in the grip housing.

In some embodiments of the present teachings, the controller may be housed in the motor housing.

In some embodiments of the present teachings, the controller may be housed downward of the motor with an attitude that extends in a front-rear direction.

In some embodiments of the present teachings, the motor is disposed such that its rotary shaft is oriented in a front-rear direction, and the controller is housed rearward of the motor with an attitude that is orthogonal to the rotary shaft.

In any of the above-described aspects and embodiments, the controller may include a control circuit board on which at least one switching device (current switching device) is installed. A microprocessor also optionally may be provided on the control circuit board to control the at least one switching device, which may more preferably be a plurality of switching devices that selectively supply current to coils of the motor. The control circuit board preferably extends in a first plane that is oblique to a second plane that contains rails of the battery-holding housing, which rails define the sliding direction of the battery pack relative to the battery-holding housing. The upper surface of the switch panel preferably extends in a third plane that is parallel to the first plane.

In at least some aspects of the present teachings, visibility and ease of operation of the switch panel are more favorable than in known power tools.

In addition or in the alternate, some aspects of the present teachings make it possible to design the entire product in a more compact manner, in particular in the up-down direction of the power tool, by reducing the thickness (height) of the battery-holding housing in the up-down direction.

DETAILED DESCRIPTION OF EMBODIMENTS

Embodiments of the present teachings are explained below, with reference to the drawings.

Figure 1:
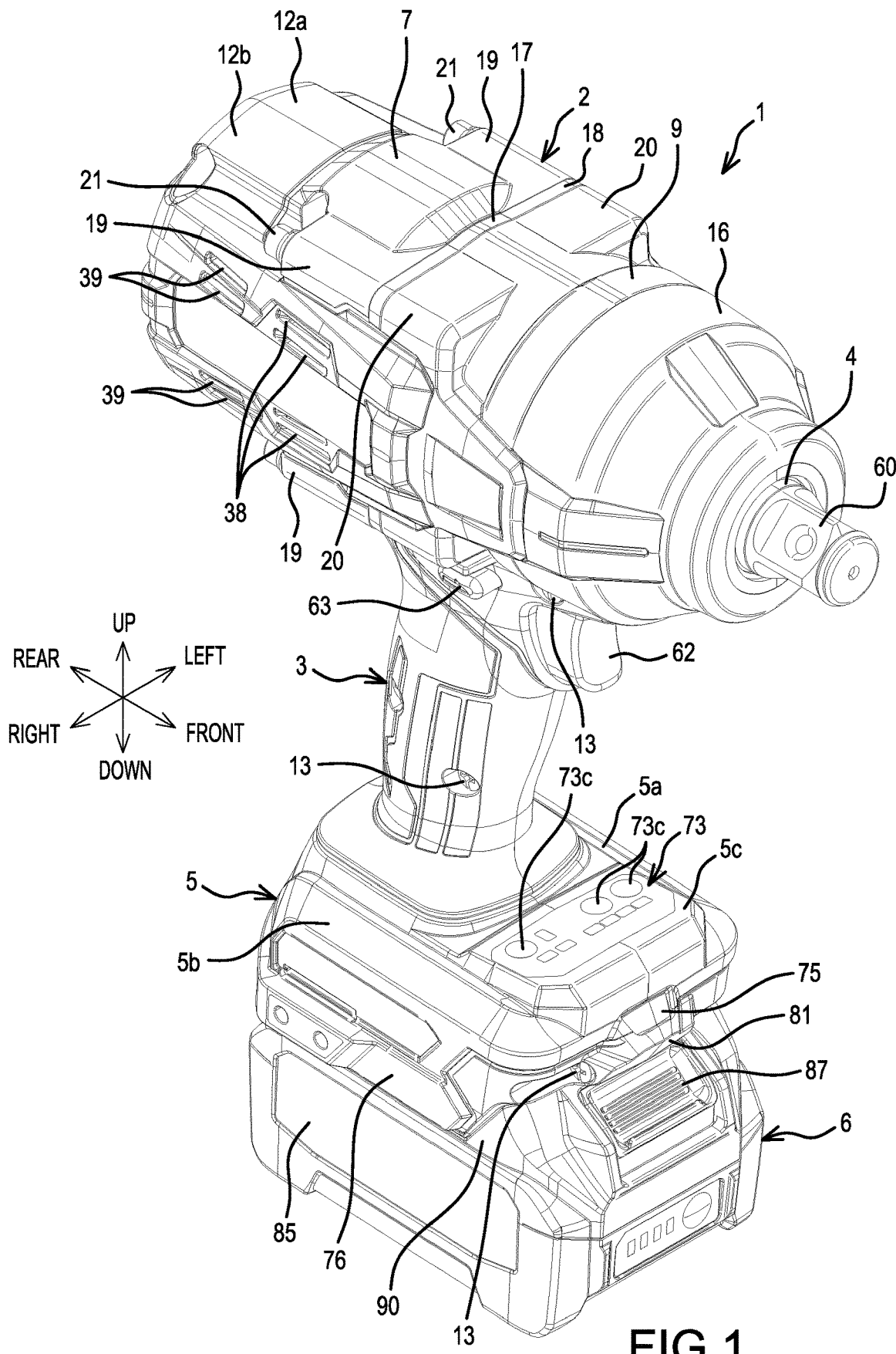
FIG. 1 is an oblique view of an impact wrench according to one embodiment of the present teachings.
Figure 2:
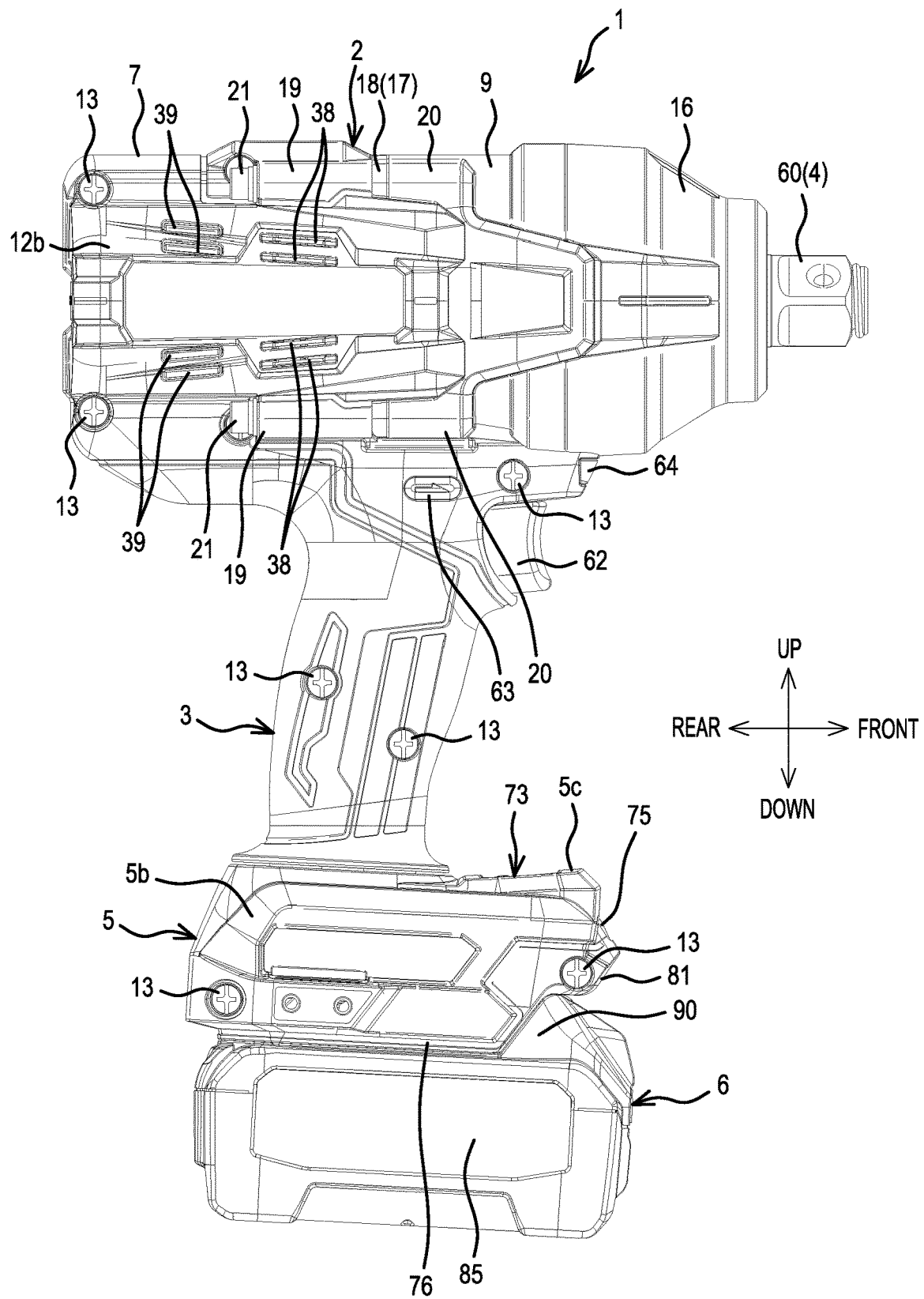
FIG. 2 is a side view of the impact wrench.
Figure 3:
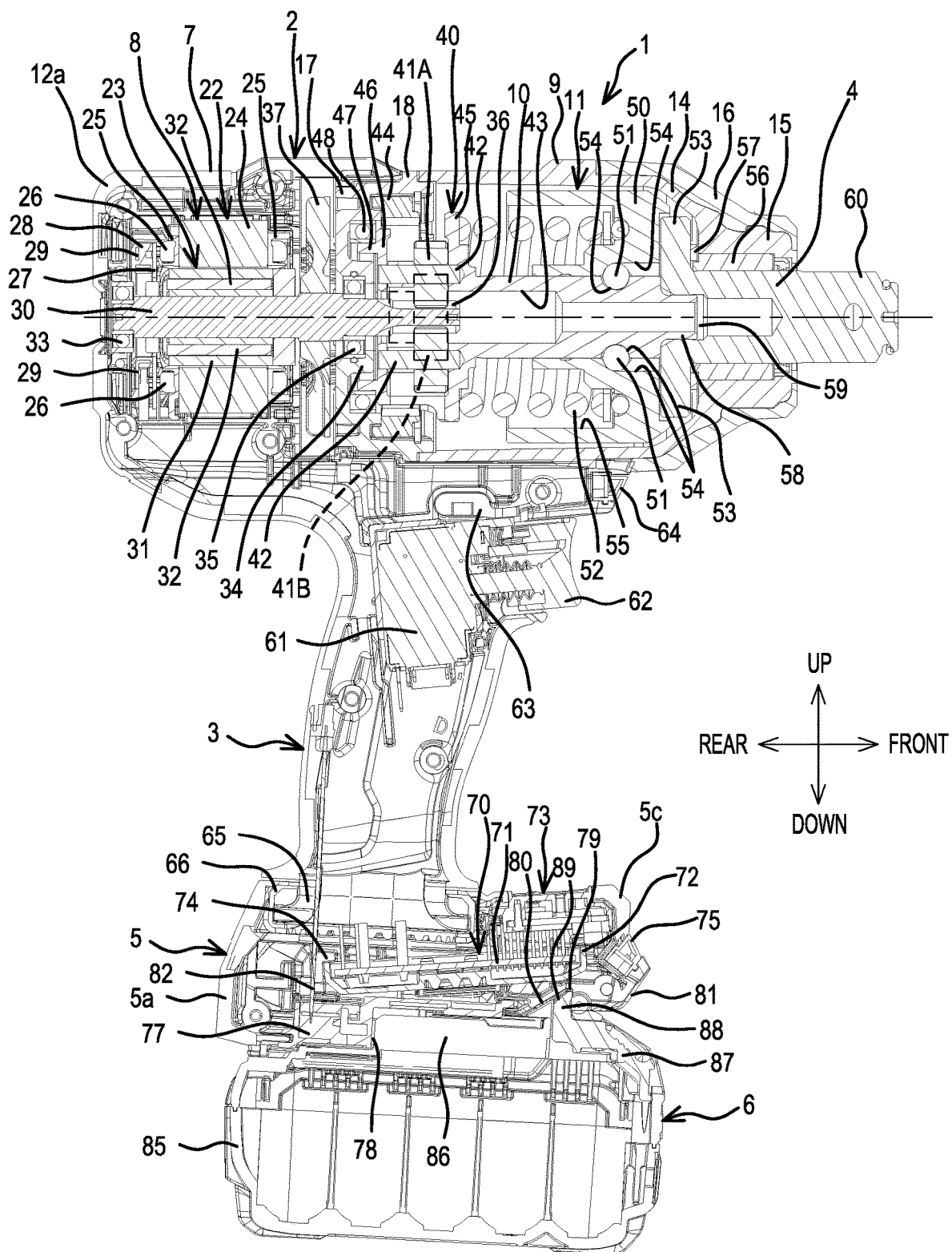
FIG. 3 is a center, longitudinal, cross-sectional view of the impact wrench.

As was noted above, FIG. 1 is an oblique view of an impact wrench 1, which is one exemplary example of a power tool and a rotary tool according to the present teachings; FIG. 2 is a side view thereof; and FIG. 3 is a center, longitudinal, cross-sectional view thereof.

The impact wrench 1 has a T shape in side view in which a handle 3 is formed downward from a main body 2, which extends in a front-rear direction. An anvil 4 protrudes beyond a tip of the main body 2. A battery pack 6, which constitutes a power supply, is detachably mounted on a battery-mount part (battery-holding housing) 5, which is provided on a lower end of the handle 3.

A housing of the main body 2 comprises: a motor housing 7, which houses a brushless motor 8; and a hammer case 9, which is assembled (joined) forward of the motor housing 7 and houses a spindle 10 and an impact mechanism 11. The motor housing 7 is made of a rigid polymer (resin) and is integrally formed with the handle 3 by assembling (joining) a pair of left and right half housings 12a, 12b using a plurality of screws 13. The hammer case 9 is a tubular body made of metal and comprises a tapered portion 14. That is, the front portion of the hammer case 9 is tapered at the tapered portion 14 and extends to a front-tube part 15, which has a smaller diameter than a rear end of the hammer case 9. A rubber cover 16 is mounted on the frontward portion of the hammer case 9 so as to cover the outer circumferences of the tapered portion 14 and the front-tube part 15.

A metal gear case 17 is disposed within the motor housing 7 and mates with the rear end of the hammer case 9. A rib 18 is provided on an outer circumference of the gear case 17 such that the rib 18 protrudes therefrom. Rearward of the rib 18, four rear bosses 19 are formed on an outer circumference of a front end of the motor housing 7. Forward of the rib 18, four front bosses 20 are formed on an outer circumference of a rear end of the hammer case 9. Therefore, by inserting four bolts 21 respectively through the four rear bosses 19 and the rib 18 from the rear and screwing them into the front bosses 20, it is possible to join the motor housing 7, the gear case 17, and the hammer case 9 together into one body. Thus, by screwing the bolts 21 into the hammer case 9, which is made of metal, the motor housing 7 and the hammer case 9 are rigidly joined to one another, and durability is also improved.

The brushless motor 8 inside the main body 2 is an inner-rotor type that comprises a rotor 23 that is rotatably disposed within the stator 22. The stator 22 comprises: a stator core 24, which has a tube shape and is formed of a plurality of laminated steel sheets; front and rear insulators 25, which are respectively provided on the front and rear end surfaces of the stator core 24 in the axial direction; and six coils 26, which are wound on the front and rear insulators 25 and on the stator core 24. On the rear-side insulator 25 are mounted: a sensor circuit board 27 on which three rotation-detection devices (not shown), which detect the positions of permanent magnets 32 provided on the rotor 23 and output rotation-detection signals, are installed; and a connecting (short-circuiting) member 28, in which a plurality of sheet-metal members 29 are insert molded. The connecting member 28 electrically connects the coils 26, in a three-phase configuration, by virtue of the sheet-metal members 29 being electrically connected to fusing terminals, which are respectively fused (electrically connected) to different portions of a winding wire that forms the coils 26.

The rotor 23 comprises a rotary shaft 30, which is located at the axial center of the rotor 23; a rotor core 31, which has a substantially circular-cylindrical shape that is disposed around the rotary shaft 30 and is formed by laminating a plurality of steel sheets; and four of the plate-shaped permanent magnets 32, which are fixed in the interior of the rotor core 31. A rear end of the rotary shaft 30 is axially supported by a first bearing 33, which is held in a rear portion of the motor housing 7. A front end of the rotary shaft 30 is axially supported by a second bearing 35, which is held by a bearing-retaining part 34 formed on the gear case 17. The front end of the rotary shaft 30, on which a pinion 36 is formed, protrudes forward of the gear case 17. A fan 37 is mounted on a portion of the rotary shaft 30 that is rearward of the second bearing 35. Air-exhaust ports 38 are formed in left and right side surfaces of the motor housing 7 radially surrounding the fan 37. Air-suction ports 39 are also formed in the side surfaces of the motor housing 7 rearward of the air-exhaust ports 38.

A carrier 40 is formed integrally with (on) a rear portion of the spindle 10. Support pins 42 project rearwardly from the carrier 40 and rotatably support four planet gears 41A, 41B. A through hole 43 is formed in (at) the axial center of a rear end of the spindle 10, and the pinion 36 of the rotary shaft 30, which is inserted into the through hole 43 from the rear with clearance, meshes with the planet gears 41A. The diameter of each of the planet gears 41B has two steps, wherein the front side is a large-diameter part and the rear side is a small-diameter part. The front-side, large-diameter parts of the planet gears 41B mesh with the planet gears 41A, and the rear-side, small-diameter parts of the planet gears 41B mesh with an internal gear 44, which is held inside the gear case 17.

The carrier 40 has a front plate 45 and a rear plate 46, which respectively support the front ends and rear ends of the support pins 42. An outer-side support part 47, whose diameter is larger than that of the outer circumference of the bearing-retaining part 34 of the gear case 17, is provided such that it is rearward facing and protrudes from a rear surface of the rear plate 46 and such that it overlaps the bearing-retaining part 34 in the radial direction of the spindle 10. A third bearing 48 is disposed between the outer-side support part 47 and the gear case 17, and a rear end of the spindle 10 is axially supported from its outer side.

In this state, the third bearing 48 is located radially outward of the second bearing 35, such that the third bearing 48 overlaps the second bearing 35 in the radial direction.

The impact mechanism 11 comprises: a hammer 50, which is externally mounted on (around) the front portion of the spindle 10; balls 51, which are provided between the hammer 50 and the spindle 10; and a coil spring 52, which biases the hammer 50 forward. The hammer 50 comprises a pair of tabs (not shown) on its front surface and is capable of engaging, in a rotational direction, with (or striking or impacting) a pair of arms 53, provided on a rear end of the anvil 4. The balls 51 span and are fitted between cam grooves 54, which are defined by an outer-circumferential surface of the spindle 10 and an inner-circumferential surface of the hammer 50, and cause the spindle 10 and the hammer 50 rotate integrally in the rotational direction. The coil spring 52 is externally mounted on (around) the spindle 10 and inserted into a ring groove 55. A front end of of the ring groove 55 is provided (defined) on a rearward-facing surface within the hammer 50. On the other side, a rear end of the coil spring 52 contacts a front surface of the front plate 45 of the part 40. Therefore, the coil spring 52 applies a biasing force that urges the hammer 50 toward an advanced position at which the tabs respectively engage with the arms 53 in the rotational direction.

The anvil 4 is axially supported by a metal bearing (plain bearing) 56 held by the front-tube part 15 so as to extend coaxially with the spindle 10. The anvil 4 is positioned in the forward direction by a restricting ring (positioning ring) 57 provided between the front-tube part 15 and the arms 53. A small-diameter part 58 provided on (at) the front end of the spindle 10 is inserted into an insertion hole 59, which is formed in the rear end of the anvil 4 at the axial center thereof and coaxially supports the spindle 10.

In addition, a mounting part (square drive) 60, which has a square shape in transverse cross section and on which a socket (not shown) is mountable (attachable), is formed on the tip of the anvil 4.

Below the hammer case 9, a switch 61, which causes a trigger 62 to protrude forward, is provided on an upper portion of the handle 3. In addition, a forward/reverse-changing button (reversing switch lever) 63, which is slidable to change the rotational direction of the brushless motor 8, is provided above the switch 61. A light 64, which comprises an LED that illuminates the space forward of the anvil 4, is provided upward of the trigger 62.

Figure 4:
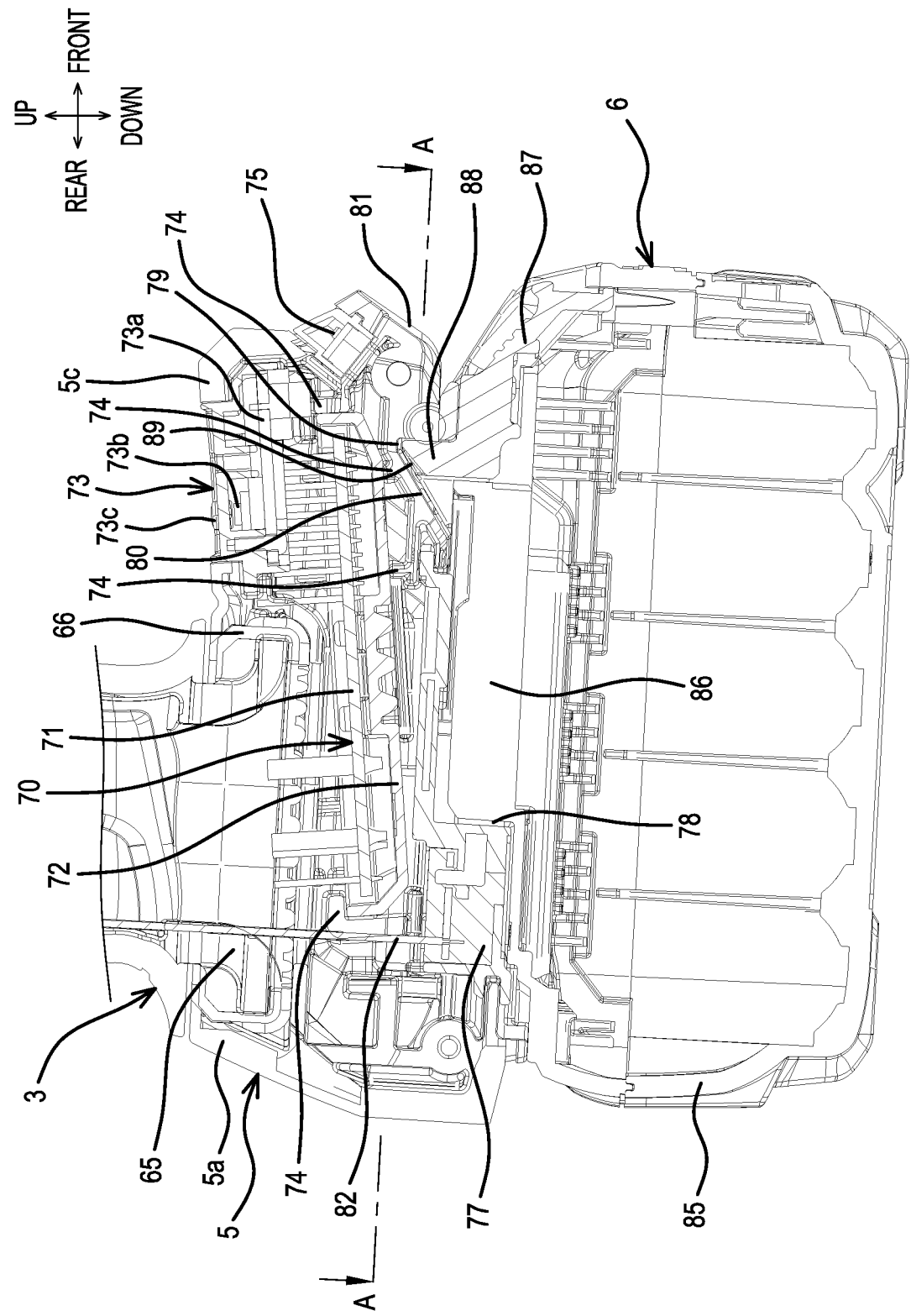
FIG. 4 is an enlarged, cross-sectional view of a battery-mount part and a portion of a battery pack of the impact wrench.

Furthermore, as shown also in FIG. 4, the battery-mount part 5 is divided into two parts, namely, the left and right half portions 5a, 5b, which are formed separately from the handle 3. The battery-mount part 5 is coupled to the handle 3 by first assembling (joining) the two half portions 5a, 5b to a coupling part 65, which has a tube shape and is provided such that it protrudes from the lower end of the handle 3, and by then fixing (securing) the half portions 5a, 5b together using the screws 13. The battery-mount part 5 protrudes forward beyond the lower end of the handle 3 in this state. Furthermore, an upper surface of the battery-mount part 5 includes a tilted upper surface portion 5c that is higher in the front (i.e. a portion of the upper surface 5c is inclined upwardly in the direction from the rear to the front of the power tool 1) such that the upper surface becomes higher as it goes forward from the lower end of the handle 3. An elastic material 66 is interposed between the coupling part 65 and the battery-mount part 5 and is capable of absorbing impacts, vibration, or the like transmitted from the handle 3 to the battery-mount part 5.

A plate-shaped controller 70, which is thin in the up-down direction, is housed within the battery-mount part 5, and comprises a control circuit board 71 housed inside a metal tray 72. Six switching devices (current switching devices, such as power FETs), a microcontroller, etc. for controlling the brushless motor 8 are installed on the control circuit board 71. A switch panel (switch plate) 73 for use in manually inputting instructions to the controller 70 and for displaying information is provided on an upper side of the control circuit board 71. A board 73a is electrically connected to the control circuit board 71 by lead wires and is a separate body that is supported parallel to the control circuit board 71. The switch panel 73 is disposed above the board 73a and comprises a plurality of switching buttons, which each comprise a depressible button 73c disposed above a pushbutton switch 73b, and a plurality of lamps. For example, the switching buttons may include one or more of an impact-force setting button, an assist-mode setting button and/or a light ON/OFF button. The lamps may include a plurality of lamps (e.g., LEDs) for indicating the impact force that was set (manually input), one or more lamps for indicating the assist-mode that has been set (manually input), a light ON/OFF indicating lamp, and/or one or more battery charge remaining (battery level) lamps. The upper surface of the switch panel 73, which includes the buttons 73c, etc., is exposed at (on) the upper surface 5c of the battery-mount part 5.

The controller 70 is also supported by support ribs 74 provided such that they each protrude from inner surfaces of the half portions 5a, 5b, with a tilted attitude that is higher in the front to hold the controller 70 parallel to the tilted upper surface 5c of the battery-mount part 5. The switch panel 73 is parallel to both the controller 70 and the upper surface 5c. At a lower portion of a front surface of the battery-mount part 5, a second light 75, which comprises an LED, is held upward facing along a forward extension of the controller 70.

Two rails 76 (FIGS. 1, 2) for mounting the battery pack 6 by sliding the battery pack 6 from the front toward the rear are formed on the left and right sides, one on each side, of a lower portion of the battery-mount part 5. A plate-shaped terminal block 77, which is thin in the up-down direction, comprises terminal plates 78 that are configured to be electrically connected to corresponding terminals on the mounted battery pack 6. The terminal block 77 is provided adjacent to the controller 70 in the up-down direction and between the rails 76. Although the rails 76 and the terminal block 77 extend parallel to one another in the same orientation, it is noted that the rails 76 and the terminal block 77 may be formed (extend) in a direction that is tilted from the front-rear direction, which is the axial direction of the main body 2 (e.g., the rotational axis of the anvil 4), such that they are slightly lower in the front, whereas the tilt direction of the upper surface 5c of the battery-mount part 5 and of the controller 70 is the reverse thereof.

Forward of the terminal block 77, a latching recess 79 is defined in and/or on the battery-mount part 5. A retractable tab 88 (further described below) provided on the battery pack 6 is configured to releasably engage in the latching recess 79 in order to block or permit, respectively, demounting of the battery pack 6 from the battery-mount part 5. The latching recess 79 is formed with a rear-side inner surface 80 that is tilted (inclined) in the upward direction such that the forward end of the surface 80 is higher than the rearward end of the surface 80. The tilt angle of the surface 80 is preferably greater than the tilt angle of the controller 70 relative to the front-rear direction (i.e. a horizontal plane).

Forward of the latching recess 79, a guide surface 81, which is tilted higher in the front at an angle greater than that of the tilt of the rear-side inner surface 80, is formed on a front surface of the battery-mount part 5.

In addition, the latching recess 79 protrudes upward until its upper end approaches (is proximal to) the bottom surface of the tray 72 at the front portion of the controller 70 and is configured such that the upper end of the latching recess 79 overlaps, in the front-rear direction, the rear portion of the controller 70. That is, e.g., a horizontal plane extending in the front-rear direction intersects both the upper end of the latching recess 79 and the rear portion of the controller 70.

Figure 5:
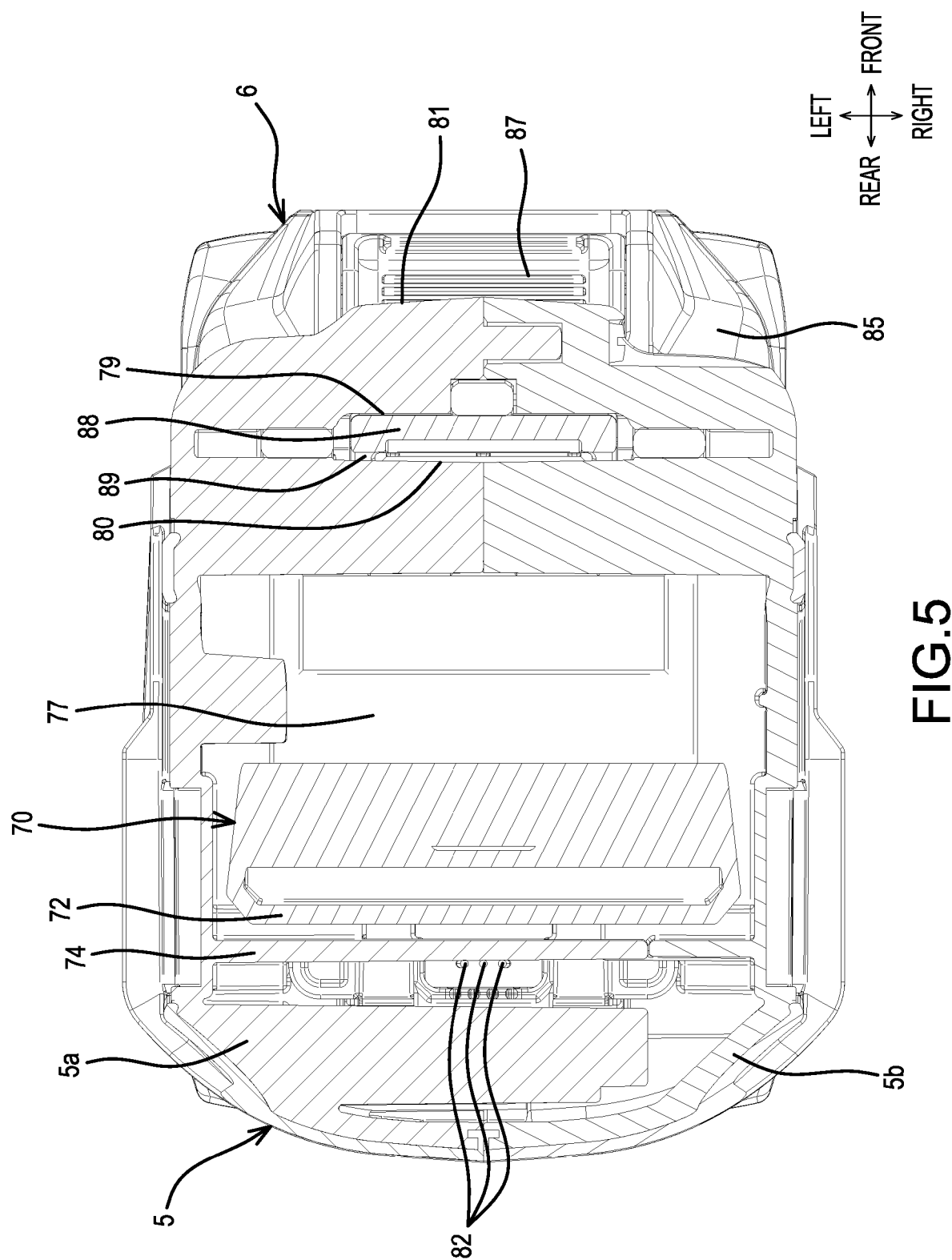
FIG. 5 is a cross-sectional view taken along line A-A in FIG. 4.

Furthermore, at least a rearward portion of the terminal block 77 is disposed more rearward than the rearward edge of the controller 70, as can be seen in FIGS. 4 and 5. Therefore, lead wires 82, which are respectively connected to terminals that extend through the terminal block 77 to an upper surface of the rear portion of the terminal block 77, can be wired (routed), without interference by the controller 70, into the interior of the handle 3 by routing (extending) the lead wires 82 directly (straight) upward or vertically.

As can be seen in FIG. 4, the battery pack 6 includes a convex mating part 86, which includes projections (not shown) on its right and left that mate between the rails 76 of the battery-mount part 5. The convex mating part 86 protrudes upwardly from an upper surface of a case (housing) 85, which houses a plurality of battery cells. When the battery pack 6 is mounted on the battery-mount part 5, connection terminals (not shown), which are provided inside the mating convex part 86, respectively electrically connect to the terminal plates 78 of the terminal block 77, thereby electrically connecting the battery pack 6 to the controller 70, etc. of the power tool 1. Forward of the convex mating part 86, a lock button 87 includes the above-mentioned tab 88 at its upper end and is provided such that the lock button 87 is biased (spring-loaded) so that the tab 88 protrudes above the case 85. A rear surface 89 of the tab 88 is tilted such that it is higher in the front and at an angle the same as that of the tilt of the rear-side inner surface 80 of the latching recess 79. As can be seen in FIGS. 1 and 2, two stoppers 90 are configured to make contact with the front ends of the rails 76 of the battery-mount part 5 and are respectively provided on the upper portion of the case 85 on the left and right of the lock button 87.

In the impact wrench 1 configured as described above, when the battery pack 6 is slid rearward from the front of the battery-mount part 5, the projections of the convex mating part 86 are respectively mated between the rails 76. In so doing, the rear surface 89 of the tab 88 makes contact with the guide surface 81, thereby pushing the lock button 87, against its bias, into the case 85 while being guided by the tilted surfaces. Subsequently, after the tab 88 has passed by a lower surface of the battery-mount part 5, the tab 88 moves upwardly into the latching recess 79 owing to the spring force applied to it and thereby latches to (in) the latching recess 79, and the stoppers 90 make contact with the front ends of the rails 76, thereby stopping the sliding and completing the mount. Simultaneous with the sliding, the terminal plates 78 of the terminal block 77 advance into the convex mating part 86 and electrically connect to the respective connection terminals. In this state, the same as with the rear surface 89 of the tab 88, as shown in FIG. 5, the rear portion of the controller 70, which is tilted forward and downward in the sliding direction (toward the rear side), and the tab 88 of the battery pack 6 overlap one another in the extension direction of the rails 76 and the terminal block 77, which intersect in the up-down direction.

In this state, when the hand, which is grasping the handle 3, manipulates the trigger 62 by pushing it in, the switch 61 turns ON, and the brushless motor 8 is driven by the current (power) supplied by the battery pack 6. Thereafter, the microcontroller of the control circuit board 71 acquires the rotational state of the rotor 23 by obtaining the rotation-detection signals, which are output from the rotation-detection devices of the sensor circuit board 27 and indicate the positions of the permanent magnets 32 of the rotor 23, controls the ON/OFF state of the switching devices in accordance with the acquired rotational state, and causes the rotor 23 to rotate by sequentially supplying (flowing) a three-phase current to the coils 26 of the stator 22.

As a result, when the rotary shaft 30 rotates, the planet gears 41A of the carrier part 40 move with planetary motion about the pinion 36 and thus the planet gears 41B move with planetary motion inside the internal gear 44, thereby reducing the rotational speed (while increasing the torque) in two stages. Because the spindle 10 rotates at a decelerated speed and the hammer 50 is caused to rotate owing to the balls 51, 51, the anvil 4 rotates owing to the engagement with the hammer 50, whereby it is possible to fasten a bolt or the like using a socket attached to the anvil 4. In addition, when the switch 61 is turned ON, the control circuit board 71 turns ON the light 64, thereby illuminating the space forward of the socket, and also turns ON the second light 75, thereby also illuminating the socket from below.

As the fastening proceeds and the torque on the anvil 4 increases, the hammer 50 begins to retract (disengage), against the bias of the coil spring 52, while the balls 51 roll rearward along the cam grooves 54. When the tabs of the hammer 50 separate from the arms 53 of the anvil 4, the hammer 50 advances, owing to the bias of the coil spring 52, while rotating. As a result, the tabs are caused to strike against (intermittently engage with) the arms 53, such that a rotational-impact force (impacts) is generated by the anvil 4 and further tightening can be performed at a higher impact force (torque).

Thus, the impact wrench 1 according to the above-described embodiment comprises, e.g., the brushless motor 8 (motor) and the motor housing 7, which houses the brushless motor 8. In addition, the impact wrench 1 comprises: the anvil 4 (which preferably includes a tool-accessory retaining part), which is rotationally driven by the brushless motor 8 (e.g., via a hammer 50) and disposed forward of the brushless motor 8; the handle 3 (grip housing), which is disposed downward of the motor housing 7; and the battery-mount part 5 (battery-holding housing), which is disposed downward of the handle 3. In addition, the impact wrench 1 comprises the battery pack 6, which is mounted on the battery-mount part 5 by being slid thereon; and the controller 70 for controlling the brushless motor 8. Furthermore, the switch panel 73 is provided downward of the handle 3 and is tilted such that it is higher in the front. The switch panel 73 includes one or more manipulatable buttons or switches and one or more display parts.

Owing to this configuration, because the switch panel 73 is easy to view as well as to manipulate from the rear of the handle 3, improved visibility and ease of operation are possible. In addition, because the front end of the switch panel 73 is the highest, external objects tend not to directly contact the switch panel 73. This helps to protect the switch panel 73 and reduce the likelihood of inappropriate manipulation (e.g., pressing) of the buttons and/or switches on the switch panel 73.

In particular, the switch panel 73 is provided on the battery-mount part 5 and has an upper surface that is tilted to be higher in the front; the switch panel 73 is exposed at (on) the upper surface of the battery-mount part 5. In this arrangement, the front portion of the battery-mount part 5 serves to protect or shield the switch panel 73.

In addition, the controller 70 is housed in the battery-mount part 5, and the switch panel 73 is disposed on the upper side of the controller 70. Thereby, the distance of the electrical connection(s) between the controller 70 and the switch panel 73 can be shorter.

In addition, the controller 70 is tilted such that it is parallel to the tilted upper surface 5c of the battery-mount part 5 and is higher in the front. As a result, the terminal block 77 and the battery pack 6 can be moved upward more than in prior designs, in which the controller 70 was oriented perpendicular to an extension direction of the handle 3 (i.e. substantially parallel to the front-rear direction), thereby making it possible to reduce the thickness of the battery-mount part 5 and to make the entire product more compact in the up-down direction that is perpendicular to the front-rear direction.

In addition, the second light 75 (light), which illuminates the space forward of the anvil 4, is provided along a forward extension of the controller 70 on the front surface of the battery-mount part 5. Thereby, even though the second light 75 is provided, it can be disposed without it protruding upward beyond the upper surface 5c of the battery-mount part 5.

In addition, in another configuration, the battery pack 6 and the controller 70 overlap one another in the sliding direction of the battery pack 6.

In addition, in another configuration, the upper portion of the battery pack 6 includes the tab 88 (the outer shape of which is tilted such that it is higher in the front), and the controller 70 is disposed with a tilted attitude that is higher in the front.

Owing to this configuration, the terminal block 77 and the battery pack 6 can be moved upward more than in prior designs, thereby making it possible to reduce the thickness (height) of the battery-mount part 5 in the up-down direction and to make the entire product more compact in the up-down direction.

In particular, an upper portion of the battery pack 6, which is tilted such that it is higher in the front, serves as the tab 88, which latches to (with) the battery-mount part 5 when the battery pack 6 is mounted on the battery-mount part 5. In addition, the controller 70 and the tab 88 overlap one another in the sliding direction of the battery pack 6 (i.e. a line perpendicular to the front-rear direction intersects both the controller 70 and the tab 88). Therefore, an overlap of the controller 70 and the tab 88 in the front-rear direction can be achieved easily owing to the tilt of the controller 70.

In addition, the terminal block 77 (tool-side terminal) is held on the lower side of the controller 70 inside the battery-mount part 5 and is electrically connectable to the battery pack 6. In addition, the controller 70 and the terminal block 77 each have a plate shape overall that is relatively thin in the up-down direction. Furthermore, the plate shape of the terminal block 77 extends in the front-rear direction, which differs from the oblique direction in which the controller 70 extends. Therefore, even though the controller 70 is tilted relative to the terminal block 77, the battery pack 6 can be mounted with the same orientation as in the past, while reducing the up-down dimension (height) of the mounted battery pack 6 in the up-down direction.

Furthermore, the tilted portion of the upper surface 5c of the battery-mount part 5 also extends in a direction that differs from (is oblique relative to) the plate shape direction (front-rear direction) of the terminal block 77. Therefore, the battery pack 6 can still be mounted on the lower side of the battery-mount part 5 with the same orientation as in the past while ensuring sufficient space within the battery-mount part 5 for the tilted controller 70.

It is noted that the configuration, the tilt angle, and the like of the controller is not limited to the above-mentioned embodiment and it may be, e.g., a standalone control circuit board without the tray. In addition, the controller may overlap with the battery pack at a location other than above the tab. The tool-side terminal also can be modified as needed.

The higher-in-the-front tilt of the battery-holding housing, which comprises the switch panel, is likewise not limited to the embodiment in which it is formed as a plane that is tilted such that it is higher in the front as in the above-mentioned embodiment. For example, it may be tilted such that it is higher in the front and formed as a curved surface that is recessed downward facing, or it may be tilted such that it is higher in the front by providing a stepped part.

Figure 6:
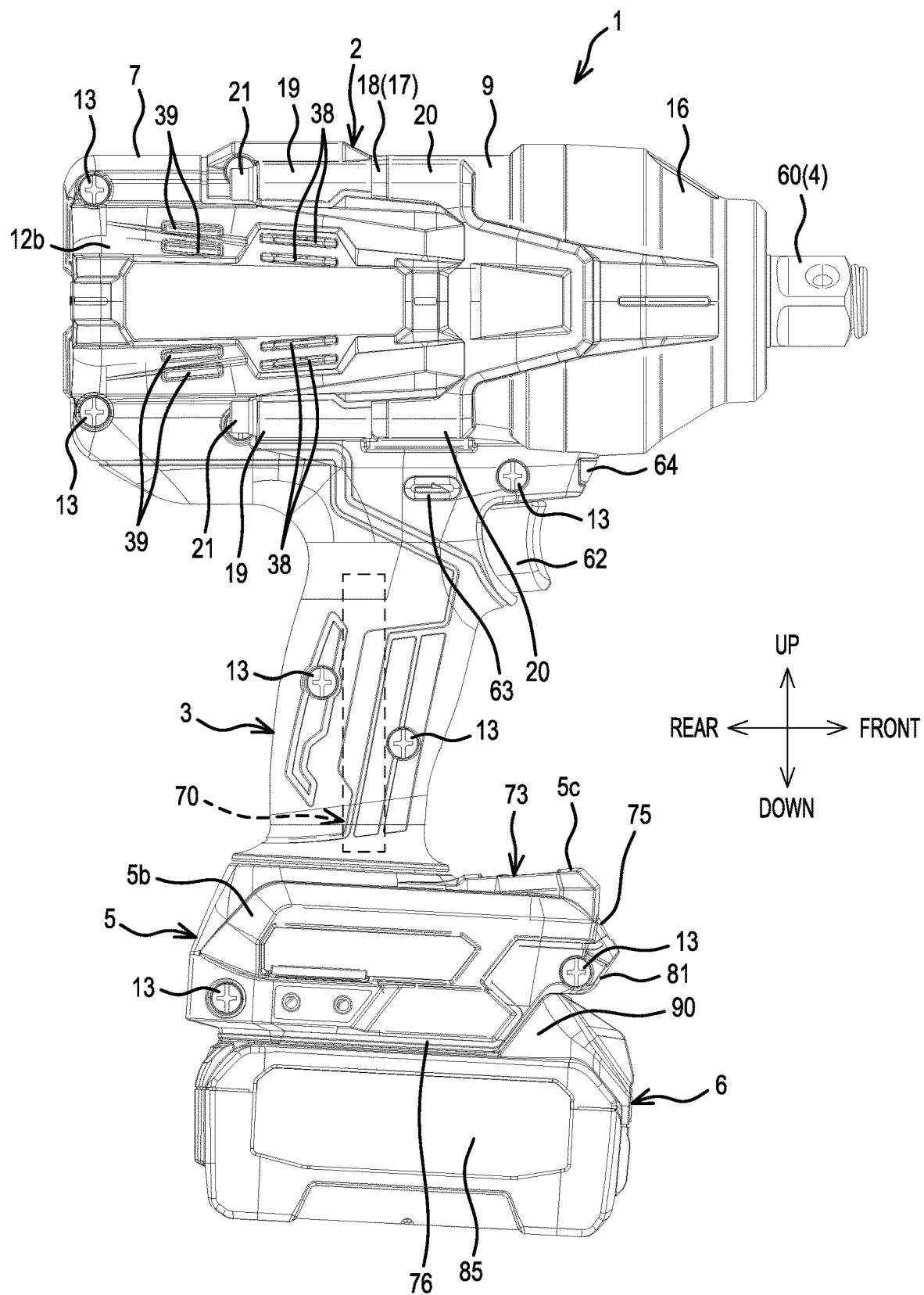
FIG. 6 is a side view of another embodiment of the impact wrench, which shows a modified example of the arrangement of a controller.

In addition, the controller is not limited to being disposed in the battery-holding housing. For example, as shown in FIG. 6, the controller 70 may be housed with a vertically oriented attitude inside the handle 3. In this embodiment, the vertically oriented attitude may be parallel to the up, down, left, and right planes as shown in FIG. 6, or the vertically oriented attitude may be parallel to the up, down, front, and rear planes.

Figure 7:
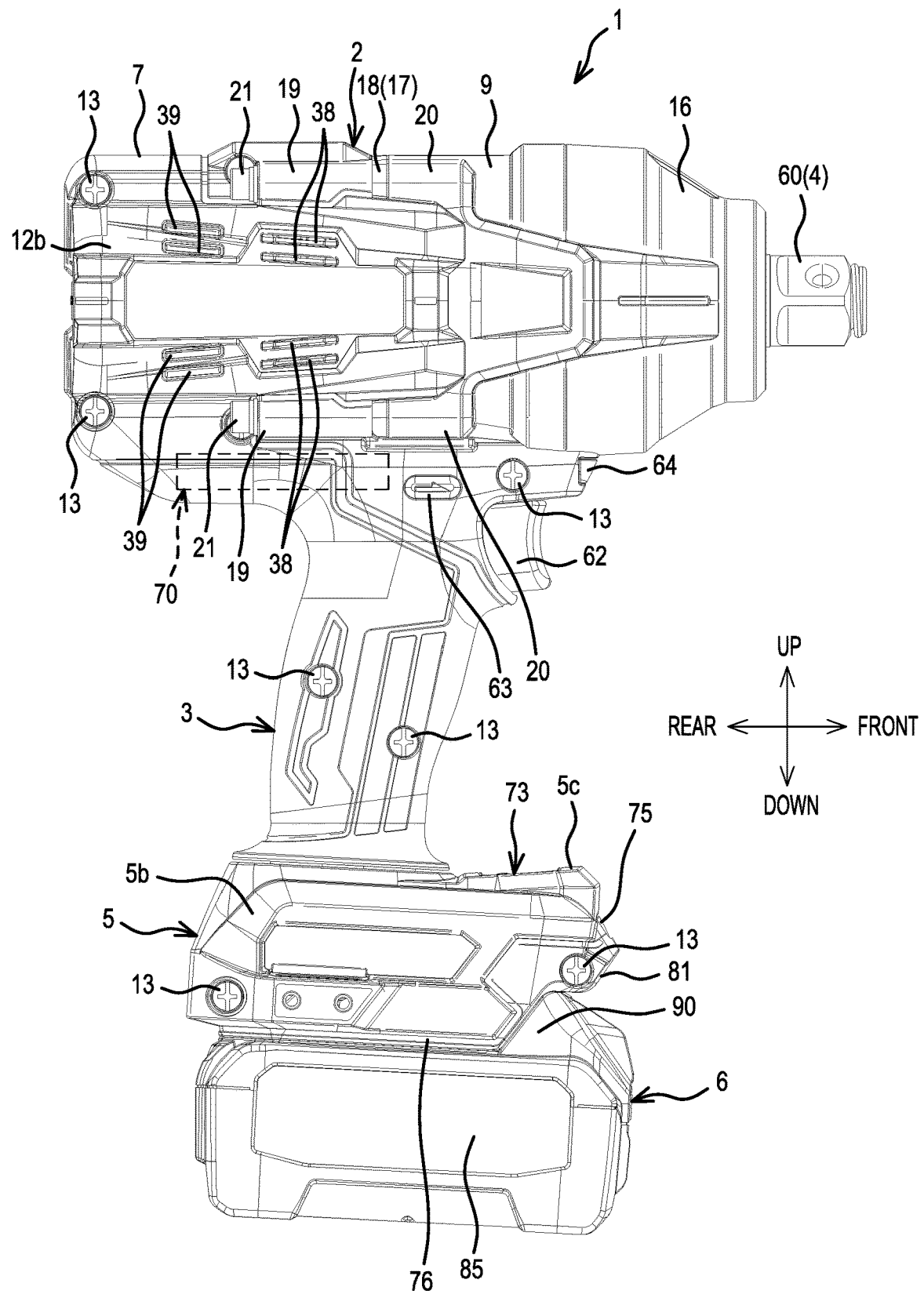
FIG. 7 is a side view of another embodiment of the impact wrench, which shows another modified example of the arrangement of the controller.

In the alternative, as shown in FIG. 7, the controller 70 may be disposed inside the motor housing 7 downward of the brushless motor 8 with an attitude such that it extends in the front-rear direction.

Figure 8:
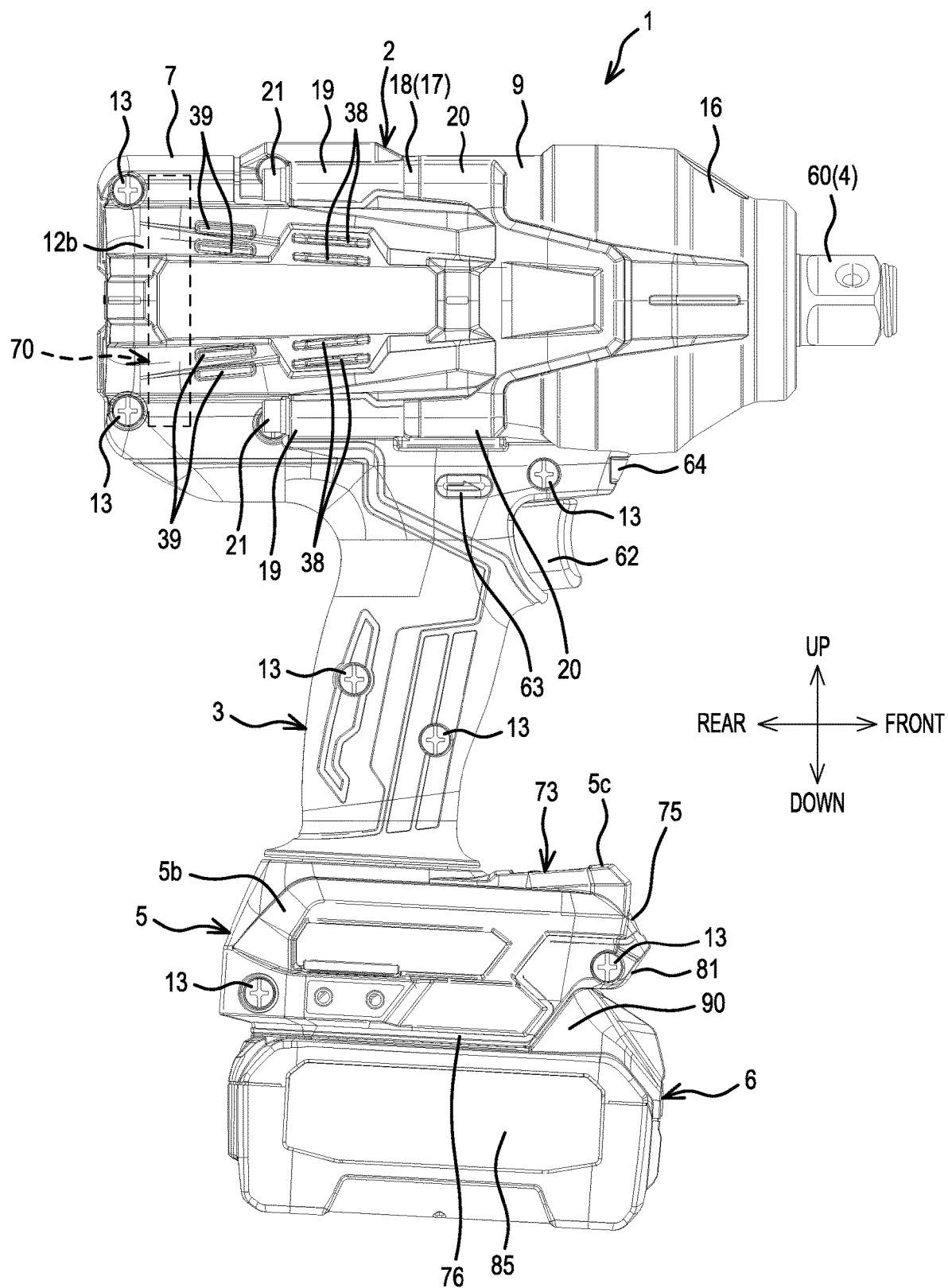
FIG. 8 is a side view of another embodiment of the impact wrench, which shows yet another modified example of the arrangement of the controller.

In another alternative, as shown in FIG. 8, the controller 70 may be disposed inside the motor housing 7 rearward of the brushless motor 8 with an attitude such that it is orthogonal to the rotary shaft 30.

If the controller 70 is provided outside of the battery-mount part 5, e.g., according to any of the above-mentioned embodiments, then the dimension (height) of the battery-mount part 5 in the up-down direction can be reduced, which may lead to more compact design overall in the up-down direction.

Furthermore, the controller of the present teachings need not include all of the switching devices, the microcontroller, etc. that are installed on the control circuit board as in the above-described embodiments, as long as the controller includes at least the switching devices.

In addition or in the alternative, the motor does not have to be brushless. In addition or in the alternative, the present teachings are not limited to an impact wrench because the present teachings are also applicable to other types of power tools such as impact drivers, driver-drills, screwdrivers, circular saws, and the like. For example, the battery-holding housing may be directly connected to the motor housing without a handle or the like being interposed therebetween. In addition or in the alternative, if the battery-holding housing is provided on the rear end or the side end of the housing instead of the lower end thereof, the controller and the battery pack preferably still overlap one another in the sliding direction of the battery pack. In this case, it is still possible to achieve a compact design in the direction in which the controller and the tool-side terminal are adjacent to one another.

The inclination of the plate-shaped controller 70 relative to the sliding direction of the battery pack 6 is preferably in the range of 5-30°, more preferably 5-20°, even more preferably 8-15°, such as about 10°. The inclination of the upper surface 5c of the battery-mount part 5 relative to the sliding direction of the battery pack 6 is preferably in the range of 5-30°, more preferably 5-20°, even more preferably 8-15°, such as about 10°. The sliding direction of the battery pack 6 may be defined, e.g., by the extension direction of the rails 76. The inclination angle of the plate-shaped controller 70 may be determined based upon a plane defined by the control circuit board 71, on which the switching devices, microprocessor, etc. are mounted. For example, the plane defined by the control circuit board 71 and a plane defined by the rails 76 preferably intersect rearward of the power tool 1, i.e. on the side of the power tool 1 that is opposite of the tool-accessory mounting part 60.

Additional aspects of the present teachings include, but are not limited to:

1. A power tool (1) comprising:
a motor (8);
a motor housing (7), which houses the motor (8);
a battery-holding housing (5), which is connected to the motor housing (7);
a battery pack (6), which is mounted on the battery-holding housing (5) by being slid relative to the battery-holding housing (5) in a sliding direction; and
a controller (70) for controlling the motor, the controller (70) being housed in the battery-holding housing (5);
wherein the battery pack (6) and the controller (70) overlap one another in the sliding direction of the battery pack (6).

2. A rotary tool (1) comprising:
a motor (8);
a tool-accessory retaining part (4), which is rotationally driven by the motor (8) and extends forward of the motor (8) in a front-rear direction of the rotary tool (1);
a motor housing (7), which houses the motor (8);
a grip housing (3), which is disposed downward of the motor housing (7);
a battery-holding housing (5), which is disposed downward of the grip housing (3);
a battery pack (6), which is mounted on the battery-holding housing (5) by being slid relative to the battery-holding housing (5) in the front-rear direction;
a controller (70) for controlling the motor (8), the controller (70) being housed in the battery-holding housing (5);
wherein:
an upper portion (88) of the battery pack (6) has an outer shape that includes a first tilt angle relative to the front-rear direction such that the first tilt angle extends upwardly toward the front in the front-rear direction; and
the controller (70) is tilted relative to the front-rear direction at a second tilt angle such that a front side of the controller (70) in the front-rear direction is higher than a rear side of the controller (70) in the front-rear direction.

3. The rotary tool (1) according to the above embodiment 2, wherein:
the upper portion (88) of the battery pack (6) includes a tab (88) configured to latch with the battery-holding housing (5) in the state in which the battery pack (6) is mounted on the battery-holding housing (5); and
the controller (70) and the tab (88) overlap one another in a sliding direction of the battery pack (6) relative to the battery-holding housing (5).

4. The rotary tool (1) according to the above embodiment 2 or 3, further comprising:
a tool-side terminal (77), which is held on a lower side of the controller (70) inside the battery-holding housing (5) and is electrically connectable to the battery pack (6);

wherein the controller (70) and the tool-side terminal (77) each have a plate shape that is thinner in an up-down direction than in the front-rear direction; and the plate shape of the tool-side terminal (77) is oblique to the plate shape of the controller (70).

5. The rotary tool (1) according to the above embodiment 2 or 3, further comprising:

a tool-side terminal (77), which is held on a lower side of the controller (70) inside the battery-holding housing (5) and is electrically connectable to the battery pack (6);

wherein the tool-side terminal (77) has a plate shape that is thinner in the up-down direction than in the front-rear direction, and at least a portion of an upper surface (5c) the battery-holding housing (5) is oblique to the plate shape of the tool-side terminal (77).

6. The rotary tool (1) according to any one of the above embodiments 2-5, further comprising:

a switch panel (73) disposed on the battery-holding housing (5), wherein the switch panel (73) includes one or more manipulatable buttons (73c) for manually inputting instructions to the controller (70); and an upper surface of the switch panel (73) is parallel to the controller (70), in particular to the plate shape of the controller (70).

7. A power tool (1), comprising:

a motor (8);

a motor housing (7), which houses the motor (8);

a tool-accessory retaining part (4), which is rotationally driven by the motor (8) and extends forward of the motor (8) in a front-rear direction of the rotary tool (1);

a grip housing (3), which is disposed downward of the motor housing (7);

a battery-holding housing (5), which is disposed downward of the grip housing (3);

a battery pack (6), which is mounted on the battery-holding housing (5) by being slid relative to the battery-holding housing (5) in the front-rear direction;

a controller (70) for controlling the motor; and a switch panel (73) disposed downward of the grip housing (3) in a tilted manner relative to the front-rear direction such that the switch panel (73) is higher in the front, wherein the switch panel (73) includes one or more manipulatable buttons (73c) for manually inputting instructions to the controller (70).

8. The power tool (1) according to the above embodiment 7, wherein:

the switch panel (73) is provided on the battery-holding housing (5), and is exposed on an upper surface (5c) of the battery-holding housing (5); and the upper surface (5c) of battery-holding housing (5) is tilted relative to the front-rear direction such that the upper surface (5c) is higher in the front.

9. The power tool (1) according to the above embodiment 8, wherein the controller (70) is housed in the battery-holding housing (5), and the switch panel (73) is disposed on an upper side of the controller (70).

10. The power tool (1) according to the above embodiment 9, wherein the controller (70) is tilted relative to the front-rear direction to be higher in the front such that the controller (70) is parallel to the upper surface (5c) of the battery-holding housing (5).

11. The power tool (1) according to the above embodiment 9 or 10, further comprising a light (65) for illuminating the space forward of the tool-accessory retaining part (4), the light (65) being provided along a forward extension of the controller (70) on a front surface of the battery-holding housing (5).

12. The power tool (1) according to the above embodiment 7 or 8, wherein the controller (70) is housed in the grip housing (3).

13. The power tool (1) according to the above embodiment 7 or 8, wherein the controller (70) is housed in the motor housing (7).

14. The power tool (1) according to the above embodiment 13, wherein the controller (70) is housed downward of the motor (8) with an attitude that extends in the front-rear direction.

15. The power tool (1) according to the above embodiment 13, wherein the motor (8) is disposed such that its rotary shaft (30) is oriented in the front-rear direction, and the controller (70) is housed rearward of the motor (8) with an attitude that is orthogonal to the rotary shaft (30).

16. The power tool (1) according to any one of the above embodiments 7-15, wherein the controller (70) includes a control circuit board (71) on which at least a switching device is installed.

17. The power tool (1) according to any preceding embodiment, wherein the controller (70) is plate-shaped and the plate shape of the controller (70) is inclined relative to the front-rear direction, and/or relative to the sliding direction of the battery pack (6) with respect to the battery-holding housing (5), by an angle of 5-30°, more preferably 5-20°, even more preferably 8-15°, such as about 10°.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools and, in particular, rotary tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Impact wrench
2 Main body
3 Handle

4 Anvil
5 Battery-mount part
6 Battery pack
7 Motor housing
8 Brushless motor
9 Hammer case
10 Spindle
11 Impact mechanism
30 Rotary shaft
50 Hammer
70 Controller
71 Control circuit board
72 Tray
77 Terminal block
79 Latching recess
80 Rear-side inner surface
82 Lead wire
87 Lock button
88 Tab

The invention claimed is:

1. A power tool having a front side and a rear side comprising:
a motor;
a motor housing, which houses the motor;
a battery-holding housing, which is connected to the motor housing and has rails that define a sliding direction of the battery pack relative to the battery-holding housing;
a battery pack, which is mounted on the battery-holding housing by being slid relative to the battery-holding housing in the sliding direction from the front side of the power tool toward the rear side of the power tool; and
a controller for controlling the motor, the controller being housed in the battery-holding housing and comprising a control circuit board having a lowermost front portion and a lowermost rear portion;
wherein:
the lowermost rear portion of the control circuit board and the battery pack overlap one another in the sliding direction of the battery pack;
the lowermost front portion of the control circuit board and the battery pack do not overlap one another in the sliding direction of the battery pack; and
the control circuit board extends in a first plane that is oblique to a second plane that contains the rails of the battery-holding housing such that:
the lowermost front portion of the control circuit board is closer to the front side of the power tool than the lowermost rear side of the power tool, and
the lowermost rear portion of the control circuit board is closer to the rear side of the power tool and is closer to the battery pack than the lowermost front side of the power tool.

2. A rotary tool comprising:
a motor;
a tool-accessory retaining part, which is rotationally driven by the motor and extends forward of the motor in a front-rear direction of the rotary tool;
a motor housing, which houses the motor;
a grip housing disposed downward of the motor housing;
a battery-holding housing disposed downward of the grip housing;
a battery pack mounted on the battery-holding housing by being slid relative to the battery-holding housing in the front-rear direction;
a controller configured to control the motor, the controller being housed in the battery-holding housing and comprising a control circuit board;
wherein:
a portion of an upper surface of the battery pack is inclined at a first tilt angle relative to the front-rear direction such that the first tilt angle extends upwardly toward the front in the front-rear direction;
the control circuit board defines a plane that is tilted relative to the front-rear direction at a second tilt angle such that a first point in the plane disposed at a front side of the control circuit board in the front-rear direction is higher in an up-down direction perpendicular to the front-rear direction than a second point in the plane disposed at a rear side of the control circuit board in the front-rear direction.

3. The rotary tool according to claim 2, wherein:
the first tilt angle is defined on a tab configured to latch with the battery-holding housing when the battery pack is mounted on the battery-holding housing;
the second point and the tab overlap one another in a sliding direction of the battery pack relative to the battery-holding housing; and
the first point and the tab do not overlap one another in the sliding direction of the battery pack relative to the battery-holding housing.

4. The rotary tool according to claim 2, further comprising:
a tool-side terminal, which is held on a lower side of the controller inside the battery-holding housing and is electrically connectable to the battery pack;
wherein the control circuit board and the tool-side terminal each have a plate shape that is thinner in an up-down direction than in the front-rear direction; and
the plate shape of the tool-side terminal is oblique to the plate shape of the controller.

5. The rotary tool according to claim 2, further comprising:
a tool-side terminal, which is held on a lower side of the controller inside the battery-holding housing and is electrically connectable to the battery pack;
wherein the tool-side terminal has a plate shape that is thinner in the up-down direction than in the front-rear direction; and
at least a portion of an upper surface of the battery-holding housing is oblique to the plate shape of the tool-side terminal.

6. The rotary tool according to claim 2, further comprising:
a switch panel disposed on an upper surface of the battery-holding housing:
wherein:
the upper surface of the battery-holding housing is inclined at a third tilt angle relative to the front-rear direction, the third tilt angle being parallel to the second tilt angle; and
the switch panel includes one or more manipulatable buttons configured to manually input instructions to the controller.

7. The rotary tool according to claim 2, wherein:
the control circuit board of the controller has a plate shape that extends in a plane;
the second tilt angle is defined by the plane of the plate shape of the control circuit board relative to the front-rear direction and/or relative to a sliding direction of the battery pack with respect to the battery-holding housing; and
the second tilt angle is 5°-30°.

8. A power tool, comprising:
a motor;
a motor housing, which houses the motor;
a tool-accessory retaining part, which is rotationally driven by the motor and extends forward of the motor in a front-rear direction of the power tool;
a grip housing disposed downward of the motor housing;
a battery-holding housing disposed downward of the grip housing;
a battery pack mounted on the battery-holding housing by being slid relative to the battery-holding housing in the front-rear direction;
a controller configured to control the motor; and
a switch panel disposed downward of the grip housing in a tilted manner relative to the front-rear direction such that an uppermost front edge of the switch panel is higher in the front than an uppermost rear edge of the switch panel,
wherein the switch panel includes one or more manipulatable buttons configured to manually input instructions to the controller.

9. The power tool according to claim 8, wherein:
the switch panel is provided on an upper surface of the battery-holding housing, and is exposed on an at the upper surface of the battery-holding housing; and
an upper surface of the switch panel and at least a portion of the upper surface of the battery-holding housing are tilted relative to the front-rear direction such that a first plane containing the upper surface of the switch panel intersects a second plane containing rails on the battery-holding housing engaged with the battery pack at a location rearward of the power tool.

10. The power tool according to claim 9, wherein the controller is housed in the battery-holding housing, and the switch panel is disposed on an upper side of the controller.

11. The power tool according to claim 10, wherein the controller is tilted relative to the front-rear direction to be higher in the front such that the controller is parallel to the first plane.

12. The power tool according to claim 10, further comprising a light for illuminating the space forward of the tool-accessory retaining part, the light being provided along a forward extension of the controller on a front surface of the battery-holding housing.

13. The power tool according to claim 9, wherein:
a control circuit board of the controller has a plate shape that extends in a third plane;
a first tilt angle is defined by the third plane relative to the second plane;
a second tilt angle is defined by the first plane relative to the second plane;
the first tilt angle is 5°-30°; and
the second tilt angle is 5°-30°.

14. The power tool according to claim 13, wherein the first tilt angle equals the second tilt angle.

15. The power tool according to claim 14, wherein the first and second tilt angles are in the range of 8°-12°.

16. The power tool according to claim 8, wherein the controller is housed in the grip housing.

17. The power tool according to claim 8, wherein the controller is housed in the motor housing.

18. The power tool according to claim 17, wherein the controller is housed downward of the motor with an attitude that extends in the front-rear direction.

19. The power tool according to claim 17, wherein the motor has a rotary shaft extending in the front-rear direction, and the controller is housed rearward of the motor with an attitude that is orthogonal to the rotary shaft.

20. The power tool according to claim 8, wherein:
the controller includes a control circuit board on which at least one switching device is installed, and
a third plane containing the control circuit board is parallel to the first plane.

* * * * *